July 9, 1974     J. W. LISKA ET AL     3,823,223

RUBBER-REINFORCING AGENT

Original Filed Oct. 22, 1968     4 Sheets-Sheet 1

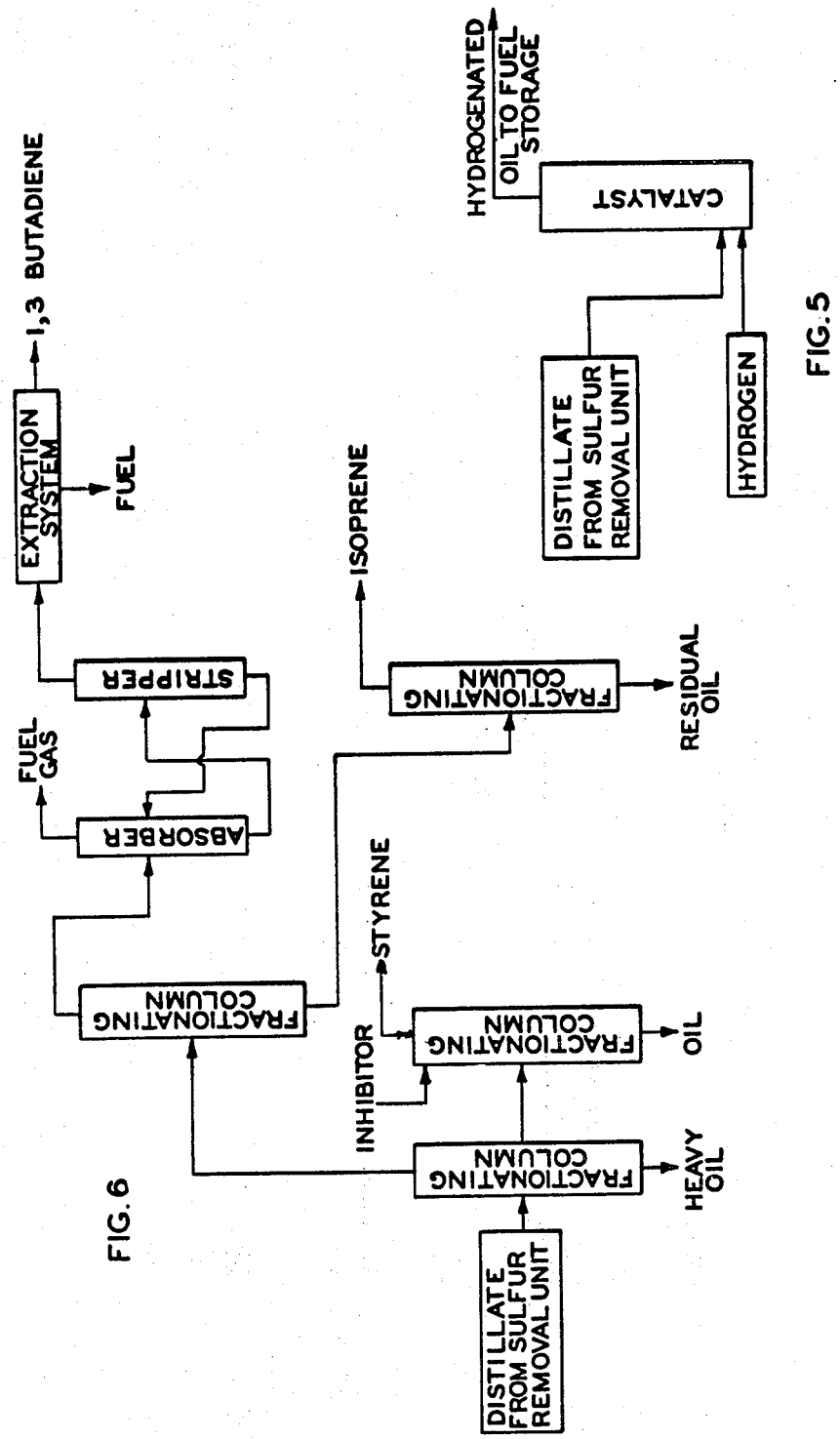

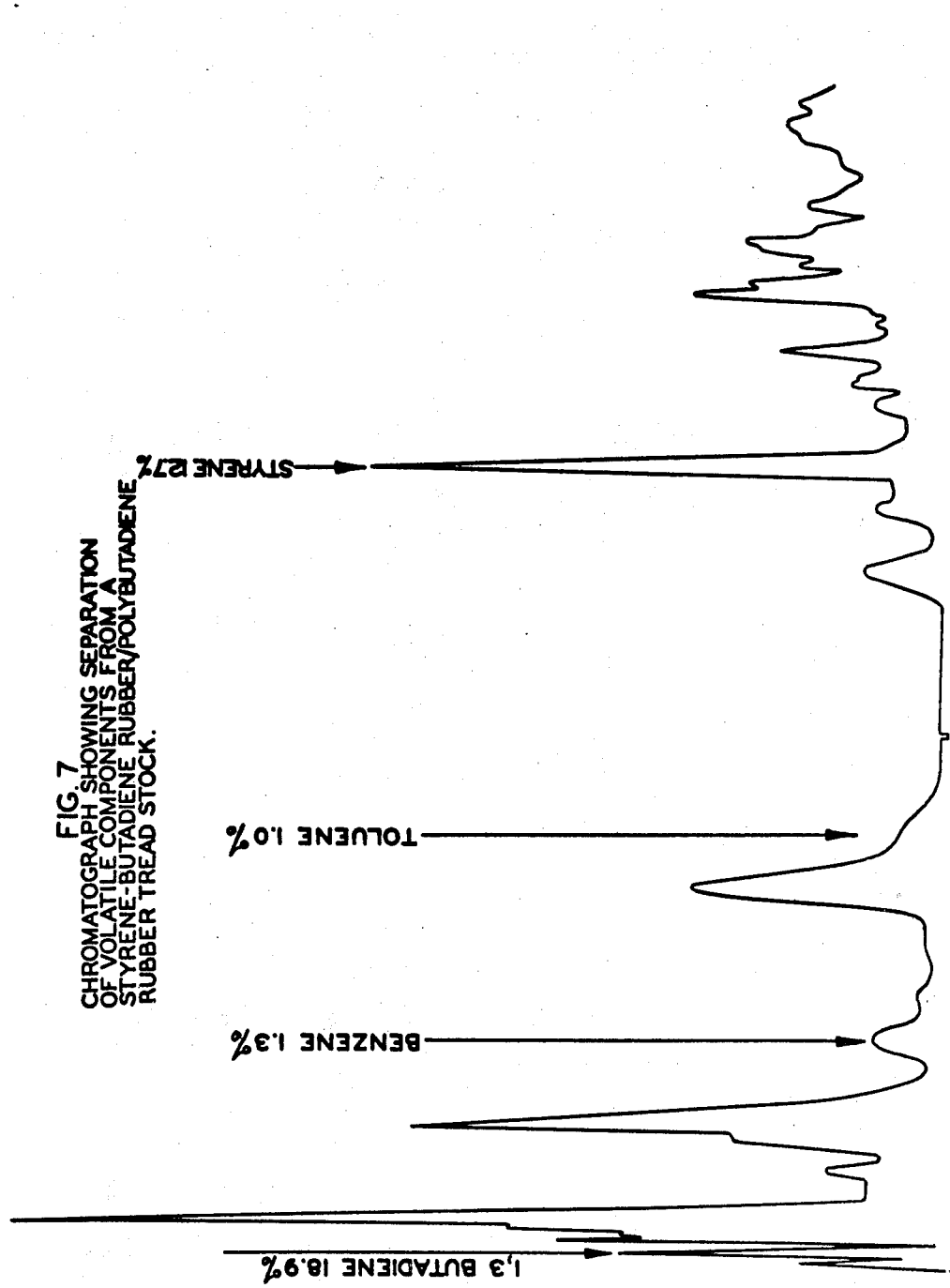
FIG. 7 CHROMATOGRAPH SHOWING SEPARATION OF VOLATILE COMPONENTS FROM A STYRENE-BUTADIENE RUBBER/POLYBUTADIENE RUBBER TREAD STOCK.

United States Patent Office 3,823,223
Patented July 9, 1974

3,823,223
RUBBER-REINFORCING AGENT
John W. Liska, Cuyahoga Falls, and Joseph A. Beckman, Akron, Ohio, assignors to The Firestone Tire & Rubber Company, Akron, Ohio
Application June 5, 1972, Ser. No. 259,435, now Patent No. 3,772,242, which is a division of application Ser. No. 151,524, June 9, 1971, which in turn is a continuation of application Ser. No. 769,571, Oct. 22, 1968, both now abandoned. Divided and this application June 25, 1973, Ser. No. 373,067
Int. Cl. C08c 11/18; C10b 51/00
U.S. Cl. 423—445  2 Claims

ABSTRACT OF THE DISCLOSURE

Scrap synthetic rubber is destructively distilled to produce a char. This char, when ground, is used in the reinforcement of rubbers.

---

This is a division of application Ser. No. 259,435 filed June 5, 1972 now U.S. Pat. 3,772,242, which is a division of application Ser. No. 151,524, filed June 9, 1971, and now abandoned, which is a continuation of application Ser. No. 769,571, filed Oct. 22, 1968, and now abandoned.

This invention relates to the destructive distillation of vulcanizate of synthetic rubber scrap (with and without vulcanizate of natural rubber scrap) and the destructive distillation of unvulcanized synthetic rubber scrap (with and without unvulcanized natural rubber scrap) and the destructive distillation of mixtures of the foregoing; and includes different distillation products and their use.

It is known that in the destructive distillation of unvulcanized natural rubber, isoprene is obtained. Therefore, it is not surprising that on the distillation of unvulcanized synthetic polyisoprene, isoprene is obtained. It may be considered obvious that on the destructive distillation of unvulcanized butyl rubber (isobutylene-isoprene or isobutylene-butadiene copolymer), isobutylene is obtained. If the butyl rubber be the isoprene copolymer, it is not surprising that isoprene also is obtained. When isoprene is polymerized or copolymerized, dangling methyl groups form on the polymer chain and on destructive distillation the bonds at these junctions are broken and isoprene is recovered. Homopolymers and copolymers formed from butadiene have a very different structure, because in the polymer chain the union of the monomers is at their ends; there are no dangling groups. It is therefore not obvious that on destructively distilling polybutadiene or butadiene-styrene copolymer or butadiene-isobutylene copolymer (butyl rubber) the chain breaks up at the ends of the butadiene monomers so that butadiene is recovered. It is not obvious that any of these monomers are obtainable by destructive distillation of vulcanizates of polymers or copolymers formed from them.

The invention relates particularly to the destructive distillation of scrap tires produced from vulcanizates of synthetic rubbers, viz polyisoprene, polybutadiene, SBR (butadiene-styrene copolymer) and butyl rubber, and other scrap from these synthetic rubber vulcanizates, and may include scrap natural rubber vulcanizate, and also scrap of unvulcanized synthetic rubber, viz polybutadiene, SBR and butadiene-isobutylene copolymer (butyl rubber), and mixtures of any of the foregoing with or without natural rubber. Tires may be fed to a still without any pre-treatment, or the beads may be first removed and in that event the remaining rubber, including the fabric, may be cut into larger or smaller pieces for feeding to the still. The fabric may first be separated, but that generally will not be done. Whether the distillation is applied to vulcanized products or the unvulcanized scrap, a valuable oil is obtained as well as a gas and a charcoal-like residue that have substantial value.

During distillation, gases are evolved which contain a substantial percentage of hydrogen sulfide. The gases may contain significant amounts of butadiene and isoprene. The hydrogen sulfide which is evolved may be converted to elemental sulfur and other sulfur products. Monomer which is recovered may be purified and used in the production of rubber polymer, etc.

The oil distillate may be recovered in one or more fractions. These may be treated from the separation of monomers which are present in vulcanized and unvulcanized synthetic rubbers, including butadiene, isoprene, styrene and isobutylene. It will usually be desirable to wash the distillate to remove hydrogen sulfide. Without separation of the monomers the oil, or a fraction thereof, may be polymerized to make a plastic resin useful for molding, etc.

A still further use for the oil would be for hydrogenation to produce a fuel which may be useful for internal combustion engines.

Another valuable use for the oil is as a fuel oil. A particular use would be as fuel for the rubber still of this process.

The charcoal-like residue taken from the retort may be used as a soil conditioner or mulch, or in the clarification of sewage, or decolorization of organic materials, or as a filtering agent as, for example, in the purification of water, etc.

The invention is further described in connection with the drawings, in which—

FIG. 5 is a flow sheet illustrating the use of distillate in a hydrogenation plant;

FIG. 6 is a flow sheet of a plant for monomer recovery from the distillate; and

FIG. 7 is the chromatograph of an oil recovered according to Example 3.

Figure 1:
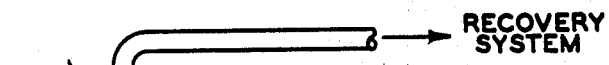
FIG. 1 is a stylized representation of a retort equipped with a recovery system.

Although in FIG. 1 the retort is of a type more generally used for batch production, it is contemplated that the retort or still used for the distillation of tires, etc., will be of the continuous type and the operation will be carried out on a large-volume basis. Such a continuous still will be provided with means for feeding the tires to the still on a continuous or incremental basis with substantial exclusion of air, and the residue will be removed, usually continuously, but it may be removed at frequent intervals. This may be accomplished by a conveyor or the like moved through the still continuously or on a start-stop basis.

For the sake of simplicity, the retort 1 shown is of the batch type and is provided with a thermocouple 2 for temperature determination and control. Any temperature-determining means may be employed. The still may be provided with electric heating units for the generation of heat, although of course it may be heated by an open fire.

The top is removable and any suitable charge of the tire or other rubber is fed to the still. The tires may be fed whole, and this will be particularly true in a larger still. For a smaller still the beads will normally first be removed and the fabric may be separated, but ordinarily the fabric will not be removed. For a batch still the rubber will usually be cut into small chunks. Unless tires of a particular type of manufacture are segregated, the tires will comprise a variety of synthetic rubbers which will be broken down into smaller chain polymers and into monomers during the distillation.

Figure 2:
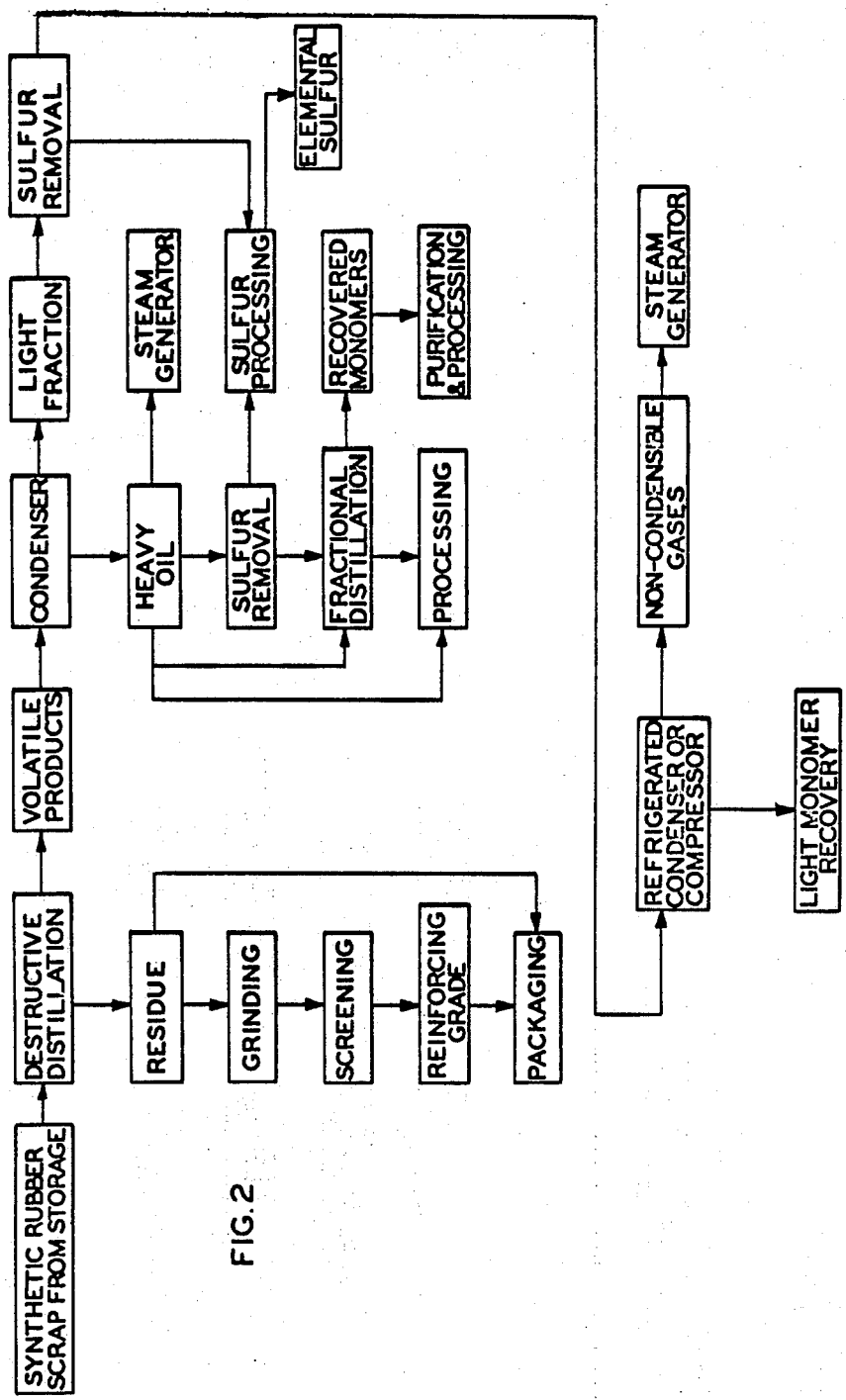
FIG. 2 is a flow sheet showing the process of distillation and recovery and processing of the residue and the volatile products.

In the type of still shown in FIG. 1, the gases will be carried over to a recovery system such as indicated in FIG. 2. FIG. 2 is a flow sheet showing the delivery of the scrap rubber to the still for destructive distillation. In shows that the residue will normally be ground and screened and packaged for uses such as those mentioned, although it may be packaged just as it comes from the still. A single condensate may be obtained from the volatile matter, although FIG. 2 shows a condenser for the recovery of heavy oil, and other condensing means for the recovery of a light oil fraction. Usually, approximately 40 percent of the oil boils from 20°–200° C. at atmospheric pressure. The remaining 60 percent of the oil boils above 200° C. The heavy oil may be condensed in two fractions; the first fraction being condensed by a water-cooled condenser at 15° C. The second fraction being condensed in an ice trap at 0° C. The fractions will generally be combined prior to distillation. Styrene will be recovered from the heavy oil, and isoprene may be separately recovered although some may be recovered from the heavy oil. Butadiene and isobutylene will be recovered subsequently.

The heavy oil after removal of monomer, may be subjected to any desired treatment. Some or all of it may be used for steam generation. Sulfur may be removed from such oil, although this is not required. For other uses, sulfur removal will be necessary, and this is indicated. The usual sulfur washing step is all that will be required for removal of hydrogen sulfide. As shown in the drawing, the wash solution from the heavy oil treatment may be joined with wash solution used in removing hydrogen sulfide from the gases and the combined liquid may be treated for recovery of sulfur by means that are known.

After treatment for removal of sulfur, the heavy oil may be fractionated and particularly valuable fractions will be fraction containing styrene and isoprene. Such fractions may, for example, have boiling ranges of about 15° to 100° C. and 100° to 200° C., respectively. The monomer recovered in such fractions can be purified by known procedures such as superfractionation and extractive distillation, and processed for use in the manufacture of rubber. The remaining heavy oil may be used in a variety of ways as previously discussed as, for example, for hydrogenation to produce a fuel for internal combustion engines.

A light fraction may be separately recovered as shown in the flow sheet, or any such light fraction may be combined with the heavy oil for treatment, as described.

The refrigerated condenser or compressor will be used to cool the gases to about −20° to −10° C. (depending upon the pressure of the operation) for condensation of butadiene (b.p. −4.4° C.) and isobutylene (b.p. −6.6° C.) which will be separated, purified and processed in a known manner. The non-condensable gases include methane, ethane, etc., and these will be recovered and may be purified and used as the industry demands.

Distillation starts on heating the rubber to about 200° C. At this temperature the products obtained are somewhat different from those obtained at higher temperaures and the still may be operated at 500 or 800° C. or as high as 1000° C. or higher.

The distillation may be conducted at sub-atmospheric or super-atmospheric pressure, but will preferably be carried out at atmospheric pressure.

The products obtained in the volatile fraction will depend upon the composition of the still charge and the temperature of operation. For example, at lower operating temperatures, e.g., 200° to 500° C., and thereabout, less hydrocarbon cracking occurs and one obtains higher molecular weight materials in the volatile fraction, while at elevated temperatures, e.g., 600° to 1000° C., and thereabout, the higher molecular weight materials are further broken down into smaller molecular weight materials.

For example, styrene and isoprene may be recovered by cooling the still gases to a suitable temperature of about 0° to 10° C., for example, to effect a crude separation from the butadiene. However, isoprene and styrene will usually be recovered from the gases in a fraction of the oil distillate. Most of the butadiene and isobutylene will be separated from the gases remaining after condensation of the oil, and the styrene and isoprene will be separated from the oil, usually by fractional distillation. These will be the principal monomers recovered, and they may be purified as is known in the art. Other products such as olefins which may be used in preparation of polymers may also be recovered.

FIG. 6 illustrates a system in which the gases are first treated for removal of the hydrogen sulfide, and then passed through a fractionating column. A heavier fraction is further fractionated in a column to which inhibitor is added and from which styrene is recovered. The lighter fraction is passed through a second fractionating column and from the heavier fraction isoprene and residual oil are recovered. The lower boiling materials are washed in a scrubber with a solvent such as hexane or the like, to remove valuable lower boiling material and fuel gas which escapes is recovered. Vapors from the stripper are passed through an extraction system for separation of butadiene from fuel. If the rubber scrap includes butyl rubber, isobutylene may be separately recovered or it may be recovered with the butadiene, and subsequently separated.

The oil which is recovered by condensation will find a variety of valuable uses. If it still contains all of the monomer or a sufficient portion, it may be polymerized to produce a plastic resin which will be useful for molding and for other usual plastic uses such as coating, etc. Any suitable catalyst may be used to polymerize it, such as, for example, sulfuric acid or other mineral acid, aluminum chloride, or other Lewis acid such as boron trifluoride, etc. The type of polymer resin obtained from the oil will depend upon the composition of the rubber scrap and the temperature at which the distillation is carried out and whether or not the entire oil distillate is polymerized or only a fraction. However, this oil and fractions thereof are of such a nature that on heating to a polymerizing temperature, usually about 200° to 300° C., with aluminum chloride or other catalyst in the absence of air, a product of higher molecular weight is produced.

The temperature and the polymerization and recovery conditions will determine the nature of the products produced. The extent of the polymerization will, of course, depend upon the ultimate use to be made of the product. The resinous product may be mixed with fillers, coloring materials, extenders, etc. to product a valuable resin for electric insulation purposes, containers, decorative materials such as door knobs, drawer pulls, curtain rods, etc.

Another valuable use for the oil is as a feed for hydrocarbon crackers.

The flow sheet of FIG. 5 illustrates one method of hydrogenating the heavy oil obtained from the still. The sulfur is first removed. Then the heavy oil, usually as a vapor, is passed over a catalyst, although the oil may be used as a liquid. Hydrogen is introduced and passed over the catalyst with the oil, the temperature required for hydrogenation being maintained. The resulting hydrogenated oil forms an excellent fuel. Catalysts for hydrogenation and the temperatures employed and the amount of hydrogen introduced are all well known in the art. A catalyst such as palladium may be used at 10° C. until sufficient hydrogen is taken up. Other catalysts which may be used include the noble metals and platinum. Temperatures up to 400° C. may be used.

The oil may be used as a fuel oil and it may be bled from the system continuously to a burner under the still, and any excess may be recovered in storage. The fuel may be used to generate steam, as for supplying heat to the recovery system of the process.

The residue in the still will usually be recovered as a charcoal-like product. Any fabric in the rubber will have been decomposed with the generation of gases and liquids. Various uses for this charcoal-like product are possible. It may be ground to form a reinforcing agent for rubbers.

Figure 4:
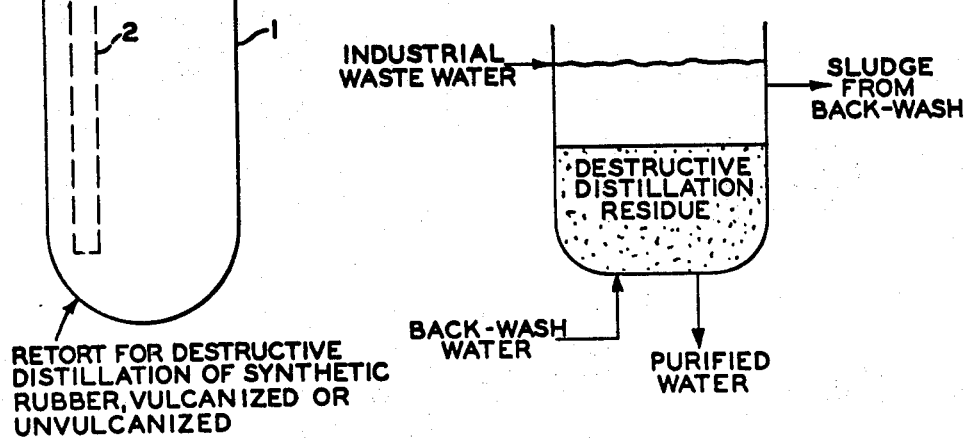
FIG. 4 is in the nature of a flow sheet showing the use of the residue in the purification of industrial waste water.

Another valuable use for the distillation residue is as a filtering and purifying agent for industrial waste water. This is illustrated in FIG. 4. The residue, usually as it is taken from the still without further processing—although sizing may at times be desirable—is placed in the bottom of the treating vessel. The industrial waste water or other water is fed to the vessel and filters through the residue and is recovered as purified water. After accumulation of sufficient waste in the residue, backwash water is introduced up through the bed of the residue and sludge which is liberated is removed as indicated. Then the process is repeated. The residue will be replaced as required. Other equipment may be used, and any desirable temperature and time of treatment may be used.

Another use for the dry residue from the distillation is as a soil conditioner. It will be disintegrated to the proper size, such as sand size, and then worked into soil such as clayey soil to soften it, as peat moss and the like are now worked into soil. More or less will be used, depending upon the condition of the soil and the use to which the soil is to be put. An advantage is that the residue will not readily disintegrate but will persist for years.

The conversion of hydrogen sulfide to elemental sulfur is well known. The gases from the still, before or after recovery of volatile matter, may be passed to a sulfur-recovery unit. Hydrogen sulfide washed from the oil may be added to that collected in a recovery unit.

If the distillation is continued to produce a dry residue, this residue will be charcoal-like, and an important use will be as a reinforcing agent to replace carbon blacks now produced by other procedures.

Figure 3:
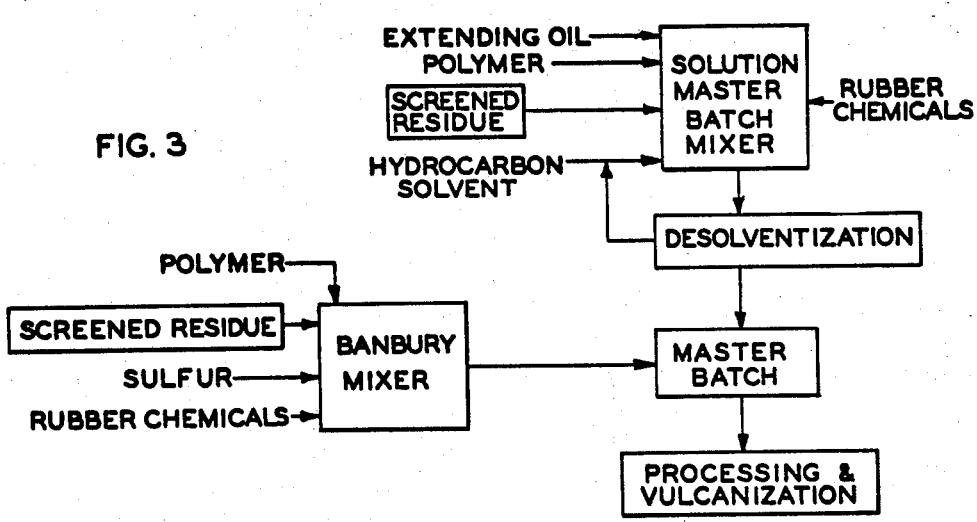
FIG. 3 is a flow sheet showing the process of using distillation residue in the manufacture of rubber reinforcing agents.

FIG. 3 is a flow sheet showing two different procedures for utilizing the screened residue from the still as a reinforcing agent. In either procedure the screened residue will be of a size to simulate carbon black, namely, in the range of about 10 to 250 millimicrons. In the one procedure this screened residue is mechanically mixed into polybutadiene, polyisoprene or butadiene-styrene or butyl rubber or other polymer. In the other procedure, the polymer, an extending oil (e.g. 25 to 75 percent the weight of the rubber) and a solvent are mixed with rubber chemicals and solvent to produce a readily mixable slurry. After mixing the solvent is removed. In a continuous procedure the solvent will be recirculated. The masterbatch, obtained by either procedure, will be processed in any usual manner and, after molding or the like, the rubber will be vulcanized.

By either procedure, the amount of residue added will depend upon the nature of the rubber, the amount of extending oil present, etc., but the amount of residue will be substantially the same as the amount of carbon black now used, which may range from a low of about 25 percent (based on the weight of the rubber) in some rubbers, to a high of about 75 percent or more in other rubbers.

As explained, the distillate is a valuable source of monomers including chiefly butadiene, isoprene, styrene and isobutylene. In a recovery system in which these are the valuable products obtained, the entire distillate may be condensed, and this would comprise a composite condensate which FIG. 2 designates as heavy oil, a light-oil fraction, and the light-oil monomer recovery from a refrigerated condenser or compressor.

It is to be understood that the recovery systems indicated in the accompanying drawings are illustrative, and modifications will be employed as the conditions warrant, and the type of modification will be governed by the products recovered.

The invention is further described in the following examples.

EXAMPLE 1

A 500 g. sample of a de-beaded scrap rubber tire which had been chopped into one-inch squares was placed in the retort of FIG. 1. The lid was placed on the retort and the exhaust tube was connected to a recovery system composed of a water condenser followed by an ice condenser which was followed by two "Dry Ice" traps.

A thermocouple was placed in the thermowell as shown in FIG. 1. The retort was heated by a natural-gas-fired burner.

The retort and its contents were heated from ambient temperature to 500° C. over a period of 30 minutes. Vapors began to evolve from the retort at about 185° C. Heating was continued until vapors no longer evolved (about 80 minutes).

After cooling, the residue in the retort weighed 200 g.; or 40 percent of the original tire weight. The volatile material was separated into factions as follows: 213 g. (42.6 percent) was condensed by the water-cooled condenser, 16 g. (3.3 percent) was condensed in the ice trap and 15 g. (3 percent) was condensed in the first "Dry Ice" trap. Only a trace of material was trapped in the second "Dry Ice" trap. These materials account for 444 g. or 88.8 percent of the original rubber charged to the process.

The residue was ground in a ball mill and was screened to a very fine mesh to yield a free flowing powder. This material was shown to have reinforcing properties for rubber tires and non-tire products.

The distillate was characterized by fractional distillation and gas chromatography. Table I shows the boiling range of various fractions.

TABLE I

| | Ml. |
|---|---|
| Volume of oil distilled | 238 |
| Fraction No. 1, b.p. 25–50° C. * | 5.3 |
| Fraction No. 2, b.p. 50–100° C. * | 52.5 |
| Fraction No. 3, b.p. 100–150° C. * | 5.4 |
| Fraction No. 4, b.p. 150–200° C. * | 16.5 |
| Volume of heavy oil boiling above 200° C. | 156.4 |

*At 745 mm. of mercury pressure.

The recovery system described is not identical with that shown in FIG. 2. The so-called "Dry Ice" trap will usually remove the butadiene and the like recovered in what FIG. 2 designates as a refrigerated condenser or compressor.

The rubber in this tire was made up of polymers containing SBR, polybutadiene rubber, and natural rubber. The distillate was shown by gas chromatography to contain isoprene (16.5 percent), 1,3-butadiene (1.1 percent) and styrene (12.1 percent).

EXAMPLE 2

A sample of an unvulcanized styrene-butadiene rubber scrap was destructively distilled as in Example 1. With this material, decomposition was much more rapid and on heating to 500° C. all volatile materials had distilled from the retort in 40 minutes. The residue from this rubber was resinous in nature. The distillate comprised 90–95 percent by weight of the initial rubber weight. The distillate contained substantial quantities of styrene and butadiene monomer. The monomer content of the distillate is dependent on the initial composition of the rubber and on the conditions (temperature, etc.) at which the distillation was conducted. Typical examples would be 5–20 percent 1,3-butadiene and 5–15 percent styrene.

EXAMPLE 3

A sample of vulcanized synthetic scrap rubber containing styrene-butadiene rubber and polybutadiene rubber from a worn tire from which the fabric had been removed was distilled at 500° C. in the same manner as in the previous examples. The distillate contained substantial quantities of butadiene and styrene. These monomers were recovered by fractional distillation of the distillate and were identified by gas chromatography. The amounts of each monomer contained in the distillate depended on the composition of the rubber and on the temperature of distillation. Typical distillates will yield 5 to 20 percent of butadiene and 5 to 20 percent of styrene, more or less.

The chromatograph is reproduced in FIG. 7.

The chromatograph shows separation of a large number of volatile components recovered from the distillation. The precentage of 1,3-butadiene shown is 18.9. The percentage of styrene shown is 12.7. Similar chromatographs from other samples will show variations in these percentages, depending upon the particular polymer being distilled and upon the temperature of the distillation. The amount of isoprene recovered from scrap containing polyisoprene will be in equally substantial amounts.

EXAMPLE 4

A sample of scrap rubber from various types of tires was distilled. The characterization of the various fractions was made by gas chromatography. Under one set of conditions, the following compounds and classes were characterized from a total of thirty-five known components: 1,3-butadiene, $C_4$ hydrocarbons, $C_5$ hydrocarbons, $C_6$ hydrocarbons, $C_7$ hydrocarbons, benzene, toluene, $C_8$ hydrocarbons, styrene, and thirteen components boiling higher than styrene. Many of these components are in the range of $C_{12}$–$C_{20}$ hydrocarbons.

The process is feasible for the distillation of tires which product a distillate containing at least 5 percent (by weight) of one or more of the monomers butadiene, isoprene, styrene or isobutylene, and preferably a distillate which comprises at least 5 percent (by weight) of any one of these monomers.

We claim:

1. As a rubber-reinforcing agent, fine particles of charcoal-like residue from the destructive distillation of synthetic rubber scrap, the size of the particles being in the range of 10 to 250 millimicrons.

2. A free-flowing powder of the fine particles of claim 1.

References Cited

UNITED STATES PATENTS

| | | |
|---|---|---|
| 1,606,380 | 11/1926 | Pagenkoff. |
| 2,098,429 | 11/1937 | Morron. |
| 3,420,913 | 1/1969 | Railsback. |

MORRIS LIEBMAN, Primary Examiner

H. H. FLETCHER, Assistant Examiner

U.S. Cl. X.R.

423—449; 106—307; 201—25; 260—2.3, 41.5 R, 680 R, 683 RF, 763

PO-1050
(5/69)

UNITED STATES PATENT OFFICE
CERTIFICATE OF CORRECTION

Patent No. 3,823,223        Dated July 9, 1974

Inventor(s) John W. Liska and Joseph A. Beckman

It is certified that error appears in the above-identified patent and that said Letters Patent are hereby corrected as shown below:

In Column 3, Line 11, "In" should be --It--.

In Column 6, Line 23, "factions" should be --fractions--.

In Column 7, Line 13, "precentage" should be --percentage--.

Signed and sealed this 26th day of November 1974.

(SEAL)
Attest:

McCOY M. GIBSON JR.            C. MARSHALL DANN
Attesting Officer              Commissioner of Patents

Disclaimer 3,823,223.—*John W. Liska*, Cuyahoga Falls, and *Joseph A. Beckman*, Akron, Ohio. RUBBER-REINFORCING AGENT. Patent dated July 9, 1974. Disclaimer filed Sept. 7, 1982, by the assignee, *The Firestone Tire & Rubber Co.*

Hereby enters this disclaimer to claims 1 and 2 of said patent.

[*Official Gazette November 16, 1982.*]